US005675712A

United States Patent [19]

Herault

[11] Patent Number: 5,675,712
[45] Date of Patent: Oct. 7, 1997

[54] METHOD AND APPARATUS FOR USING A NEURAL NETWORK TO EXTRACT AN OPTIMAL NUMBER OF DATA OBJECTS FROM AN AVAILABLE CLASS OF DATA OBJECTS

[75] Inventor: Laurent Herault, Claix, France

[73] Assignee: Commissariat a l'Energie Atomique, Paris, France

[21] Appl. No.: 424,011

[22] Filed: Apr. 18, 1995

[30] Foreign Application Priority Data

May 2, 1994 [FR] France ................... 94 05324

[51] Int. Cl.$^6$ ................... G06F 15/18
[52] U.S. Cl. ................... 395/23; 395/22; 395/24; 395/21
[58] Field of Search ................... 395/22, 24, 21, 395/23

[56] References Cited

U.S. PATENT DOCUMENTS

| | | | |
|---|---|---|---|
| 4,918,618 | 4/1990 | Tomlinson, Jr. | 395/21 |
| 5,195,170 | 3/1993 | Eberhardt | 395/24 |
| 5,226,092 | 7/1993 | Chen | 382/157 |
| 5,504,841 | 4/1996 | Tani | 395/81 |

FOREIGN PATENT DOCUMENTS 0 557 997   2/1993   European Pat. Off. .

OTHER PUBLICATIONS

Churchland et al., "The Computational Brain," The MIT Press, Cambridge, MA Dec. 30, 1992.

Chuanyi and Psaltis (1991) "The Capacity of a Two Layer Network with Binary Weights," Neural Networks, 1991 IEEE International Conference (Seattle), vol. II p. 127 Dec. 1991.

Jagota (1993) "Optimization by Reduction to Maximal Clique," Neural Networks, 1993 IEEE International Conference, p. 1526 Dec. 1993.

Jagota et al. (1994) "Information Capacity and Fault Tolerance of Binary Weights Hopfield Nets," Neural Networks, 1994 IEEE International Conference, vol. II, p. 1044 Dec. 1994.

Yuan and Chen (1990) "Neural Net Decoders for Some Block Codes," IEE Proceedings, Part I: Communications, Speech, and Vision, vol. 137, Pt. I, No.5, p. 309 Oct. 1990.

van Hemmen and Kuhn (1986) "Nonlinear Neural Nets," Physical Review Letters, vol. 57, No. 7, p. 913 Dec. 1986.

(List continued on next page.)

Primary Examiner—David K. Moore
Assistant Examiner—Ji-Yong D. Chung
Attorney, Agent, or Firm—Burns, Doane, Swecker & Mathis LLP

[57] ABSTRACT

Method and apparatus for selecting an optimal number of trajectories from an available class of potential trajectories in a velocimetry application. In an exemplary method, a neural network is constructed wherein each neuron in the network represents a trajectory in the overall class. A binary output of each neuron indicates whether the trajectory represented by the neuron is to be selected. In the exemplary method, the neural network is initialized with a starting solution wherein the network is in an initially converged state. The network is then alternately excited and constrained so that it settles to additional converged states. During excitation, correction factors including a set-size maximizing term are applied to neuron input potentials. During constraint, the set-size maximizing terms are interrupted. Each time the network converges, the outputs of the neurons in the network are decoded to obtain a subset of trajectories which are to be selected. The excitation and constraint phases are then repeated in an attempt to obtain larger and larger subsets of trajectories to be selected. Once the excitation and constraint phases have been repeated a suitable number of times, the trajectories identified in the largest obtained subset of trajectories are selected.

14 Claims, 4 Drawing Sheets

OTHER PUBLICATIONS

Hertz et al. "Introduction to the Theory of Neural Computation," Addison–Wesley Publishing Company, Mar. 1992 Dec. 1991.

Identification and Decentralized Adaptive Control Using Dynamical Neural Networks With Application To Robotic Manipulators—Karakaşoğlu, et al.—IEEE Transactions On Neural Networks—vol. 4, No. 6—Nov. 1993, New York US—pp. 919–930.

METHOD AND APPARATUS FOR USING A NEURAL NETWORK TO EXTRACT AN OPTIMAL NUMBER OF DATA OBJECTS FROM AN AVAILABLE CLASS OF DATA OBJECTS

TECHNICAL FIELD

The present invention relates to a process and a device for extracting a larger subset of objects using a neural network.

PRIOR ART

Neuromimetic networks have been widely studied for many years and various applications have been developed, particularly for the resolution of shape recognition and optimization problems.

Neuromimetic networks use a digital information and are systems performing calculations based on the behaviour of physiological neurons. A neuromimetic model is characterized by three basic parts, i.e. a network of formal neurons, an activation rule and evolution dynamics.

The network is formed from a set of formal neurons. A formal neuron is an arithmetic unit constituted by an input, called potential (designated u) and an output, corresponding to a digital activation level (called p). At each instant, the activation level of each neuron is communicated to other neurons. Thus, the neurons are connected together by weighted connections, called synaptic weights. The weight of the connection between the output of the neuron i and the input of the neuron j is designated $w_{ij}$. The total activation quantity at the input $u_j$ received by the neuron j from the other neurons at each instant is used by said neuron to update its network. It is sometimes called the potential (or activation potential) of the neuron j.

The activation rule of a neuromimetic network is a local procedure followed by each neuron on updating its activation level as a function of the activation context of the other neurons. Thus, the output of a neuron is given by a non-linear transfer function applied to the potential. This non-linear function can be a threshold function, which is also known as the MacCullogh and Pitts function and defined by the neuron i considered at the date t, by:

$$\begin{cases} p_i(t) = 1 & \text{if } u_i(t) > 0 \\ p_i(t) = 0 & \text{if } u_i(t) < 0 \\ p_i(t) = p_i(t-1) & \text{if } u_i = 0 \end{cases} \quad (1)$$

The evolution dynamics constitutes the rule permitting the updaating of neurons. At the outset (t=0), the outputs of neurons are drawn at random (0 or 1) and then the network evolves by updating its neurons. In order to update a neuron i at instant t, its potential at said date is calculated:

$$u_i(t) = u_i(t-1) + \Delta u_i(t) \quad (2)$$

The potential variation $\Delta u_i(t)$ will correspond to the evolution dynamics. Different models exist in the prior art for defining said dynamics. According to the sign of $\Delta u_i(t)$ between two updatings of the neuron i, it is said that the neuron is inhibited (negative potential variation tending to bring the output to 0) or excited (positive potential variation tending to bring the output to 1). If its potential is strictly positive, the neuron places its output at 1 and it is activated. If its potential is strictly negative it places its output at 0 and is deactivated. If its potential is 0, the value of the output remains unchanged. Thus, the output of neuron i can be induced to change between two updatings. It is said that the network has converged if, for each neuron, no updating modifies the potential of the neuron.

The convergence mode is defined by the order in which the neurons are updated. Its choice is of great importance for the quality of the convergence. The convergence mode can be:

asynchronous: one neuron is updated at once, the new output calculated during its updating being used for the updating of the other neurons and the neurons can be sequentially updated in a fixed order (reference is then made to sequential asynchronous mode) or in random manner (reference is then made to random asynchronous mode);
synchronous: all the neurons are updated simultaneously;
synchronous by block: the neuron blocks are synchronously updated.

Certain evolution dynamics will now be given for solving the optimization problems.

The model used as a basis for the main neural optimization algorithms is the model presented by J. Hopfield and D. Tank in the article entitled "Neural computation of decisions in optimization problems" (Biological Cybernetics, vol. 52, pp. 141–152, 1985). They define an energy function E:

$$E = -\frac{1}{2} \sum_{i=1}^{n} \sum_{j=1}^{n} w_{ij} \cdot p_i \cdot p_j - \sum_{i=1}^{n} I_i \cdot p_i \quad (3)$$

The neural outputs $p_i$ are analog between 0 and 1 and $I_i$ represents an input bias. This energy can seen as the physical energy of a spin glass system. As the energy E encodes the problem, the latter amounts to minimizing said energy at the convergence of the network. J. Hopfield in an article entitled "Neural networks and physical systems with emergent collective computational abilities" (Proceedings of the National Academy of Sciences, vol. 79, pp. 2554–2558, 1982) demonstrates in the Hopfield theorum that:
if the evolution dynamics of the network are:

$$\Delta u_i(t) = -\frac{\Delta E}{\Delta p_i}(t)$$

if the activation rule used is that of MacCullogh-Pitts, and if the matrix of the synaptic weights is symmetrical ($w_{ij} = w_{ji}$),
then, for any neuron i and at any date t:

$$\frac{\Delta E}{\Delta t}(t) \leq 0$$

Thus, the energy will decrease, during the evolution of the system, until it reaches a minimum.

In the prior art, the operator adjusts parameters in order to establish compromises between satisfying the contraints and maximizing the size.

The process of the invention makes it possible to know if a solution is or is not in relation with the others. This knowledge guarantees both the satisfying of all the constraints linked with the considered application and the maximization of the size.

The object of the invention is to propose a process and a device for extracting the largest subset of objects from a set of objects in relation and pairwise in relation or not in relation and which can advantageously use an original neuromimetic network.

DESCRIPTION OF THE INVENTION

The invention relates to a process for the extraction of a larger subset of objects, such as potential trajectories in a velocimetry application, using a neural network, characterized in that it comprises the following stages:

a stage of constructing a recursive neural network from objects and relations between the objects by associating with each object the binary output of a formal neuron $p_i(t)$ at a date t:

$p_i(t)=1 \Rightarrow$ the object belongs to the sought subset,
$p_i(t)=0 \Rightarrow$ the object does not belong to the sought subset;

a stage of Using an interruption process in order to obtain subsets of objects in pairs which are not related or related such that each subset found cannot be included in a larger subset and passage from one subset to another takes place by attempting to increase its size;

a stage of initializing the output of the potential of each neuron in such a way that, for each neuron, they prove:

$p_i(t=0)=1 \Leftrightarrow u_i(t=0) \geq 0$
$p_i(t=0)=0 \Leftrightarrow u_i(t=0) \leq 0$ a stage of the recursive dynamic operation of the network;

a choice stage among the listed subsets of the largest subset by comparison of sizes.

Advantageously the network recursive dynamic operation stage comprises an asynchronous updating (e.g. random or sequential) of the set of neurons of the network, by successively scanning the neurons applying to their potential a previously calculated correction, which is dependent on the values of the outputs of the other neurons and relations existing between the objects in such a way that globally, after decoding outputs of neurons, a list of subsets of objects in pairs and not related is obtained, each of the subsets not being includable in a larger subset.

The invention also relates to a device incorporating a neural network and comprising:

a first table memory of the outputs pi of neurons receiving the output of a choice circuit of an integer from 1 to N;

a second memory of relations between objects;

a third table memory of potentials of neurons connected to the output of the choice circuit of an integer;

a fourth table memory of the last variations of potentials of neurons linked with the output of the choice circuit of an integer;

a first computing circuit making it possible to compute $A.p_i.T(\{p_j\})$;

a second computing circuit making it possible to compute $B.(1-p_i).S(\{p_j\})$;

a third computing circuit making it possible to compute $C.R(\{p_j\})$;

these three computing circuits being connected to the outputs of the first two memories and to the output of the choice circuit of an integer;

an interruption device connected to the output of the third computing circuit and to the outputs of the fourth memory;

a first adder receiving the outputs of the first two computing circuits and the interruption device and connected to the input of the fourth memory;

a second adder receiving the outputs of the third memory and the first adder and connected to the input of the third memory;

a thresholding function circuit having a binary output receiving the output of the second adder and connected to the input of the first memory.

Advantageously this neural network is applicable to:
optimum control processes for means during time,
velocimetry,
the resolution of routing problems in telecommunications networks,
the optimization of communications between satellites,
the optimization of the component arrangement geometry in CAD,
the planning of flight schedules,
the planning of industrial production.

DETAILED DESCRIPTION OF EMBODIMENTS

The lexicon at the end of the description forms part of said description. In order to facilitate the description, hereinafter the case will be presented where subsets are sought pairwise which are not related. Obviously the process of the invention is also applicable to the seeking of subsets of objects in pairs and which are related by substituting for the matrix $(e_{ij})$ of relations, the matrix $(1-e_{ij})$.

Figure 1:
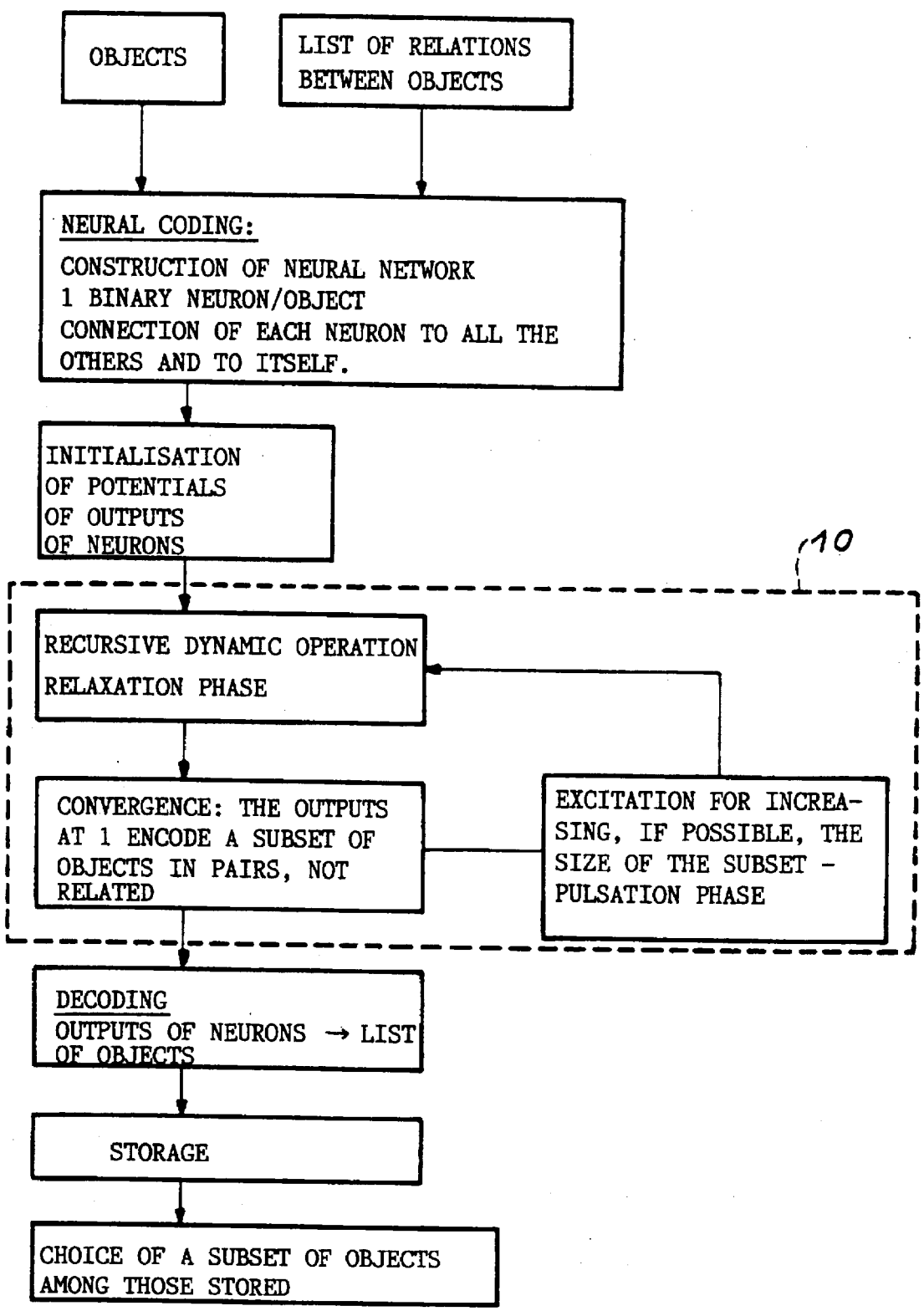
FIG. 1 illustrates the different stages of the process according to the invention.

The process of the invention comprises several stages illustrated in FIG. 1.

Use is made of a formal neural network able to determine a subset of objects in pairs, which are not related and of maximum quality, where the quality is measured like the number of objects in the subset found. The following stages are involved:

Construction of a recursive neural network from objects and relations between objects associating with each object the binary output of a formal neuron $p_i(t)$:

$p_i(t)=1 \Rightarrow$ the object belongs to the sought subset
$p_i(t)=0 \Rightarrow$ the object does not belong to the sought subset.

The use of an interruption process in order to obtain subsets of objects in pairs which are not related so that each subset found cannot be included in a larger subset. There is a passage from one subset to another by attempting to increase its size.

Initialization takes place of the output (e.g. 0) and the potential of each neuron in such a way that, for each neuron i, they prove:

$p_i(t)=1 \Leftrightarrow u_i(t=0) \geq 0$
$p_i(t)=0 \Leftrightarrow u_i(t=1) \leq 0$ Recursive dynamic operation of the network takes place. There is an asynchronous updating (e.g. random or sequential) of the set of neurons of the network, by scanning the neurons in succession and by applying to their potential a previously calculated correction, which is dependent on the values of the outputs of the other neurons and relations existing between the objects. On each occasion when the network has converged, after the decoding of the outputs of the neurons a subset of objects in pairs and not related is obtained and stored. Globally, following the decoding of the outputs of the neurons, a list is obtained of subsets of objects in pairs and which are not related, it not being possible to include the said subsets in a larger subset.

A choice is made from among the listed subsets of the largest subset by size comparison.

Figure 4:
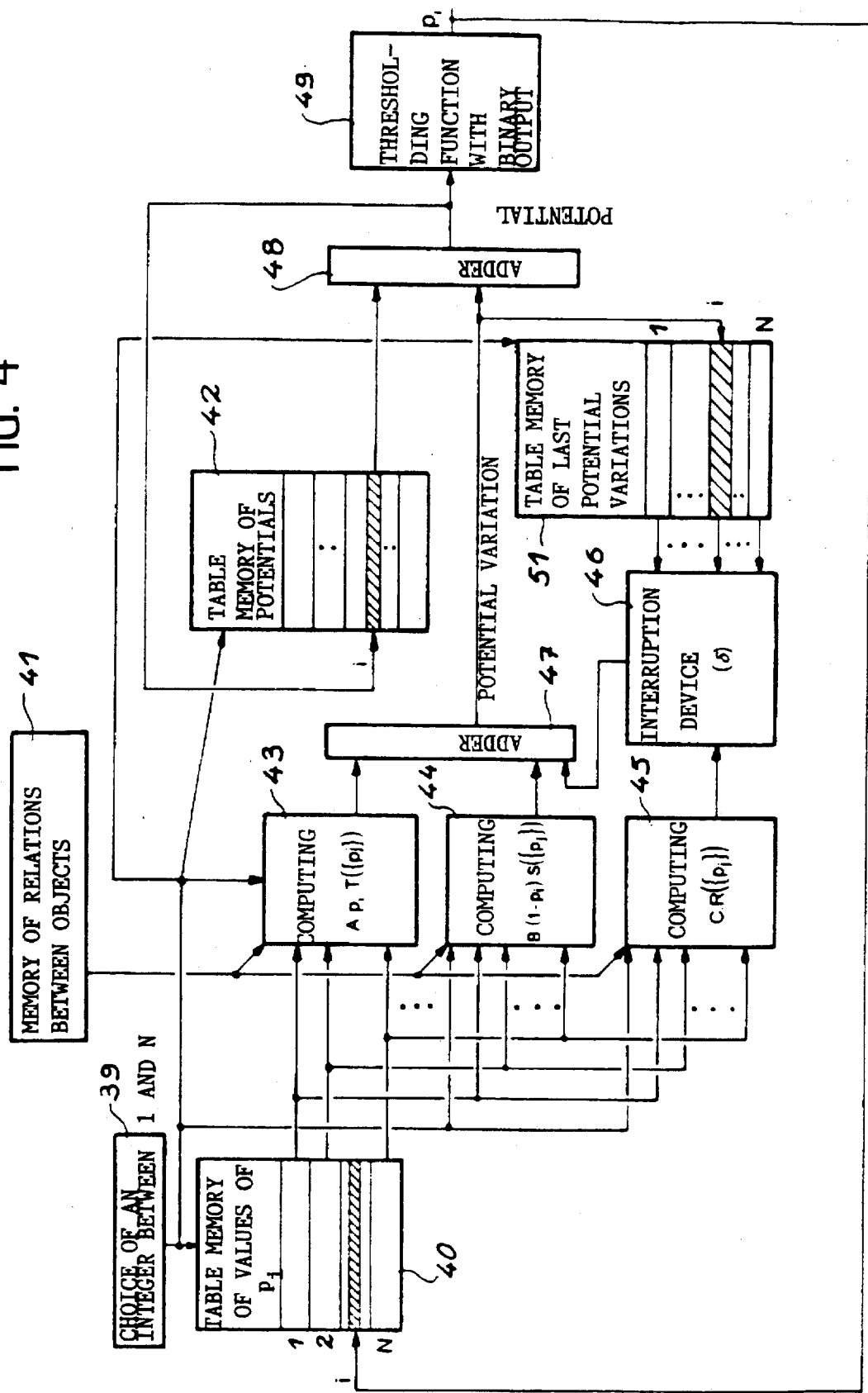

The device illustrated in FIG. 4 corresponds to the dotted line rectangle 10 in FIG. 1.

RECURSIVE DYNAMIC OPERATION OF THIS FIRST NEURAL NETWORK

Figure 2:
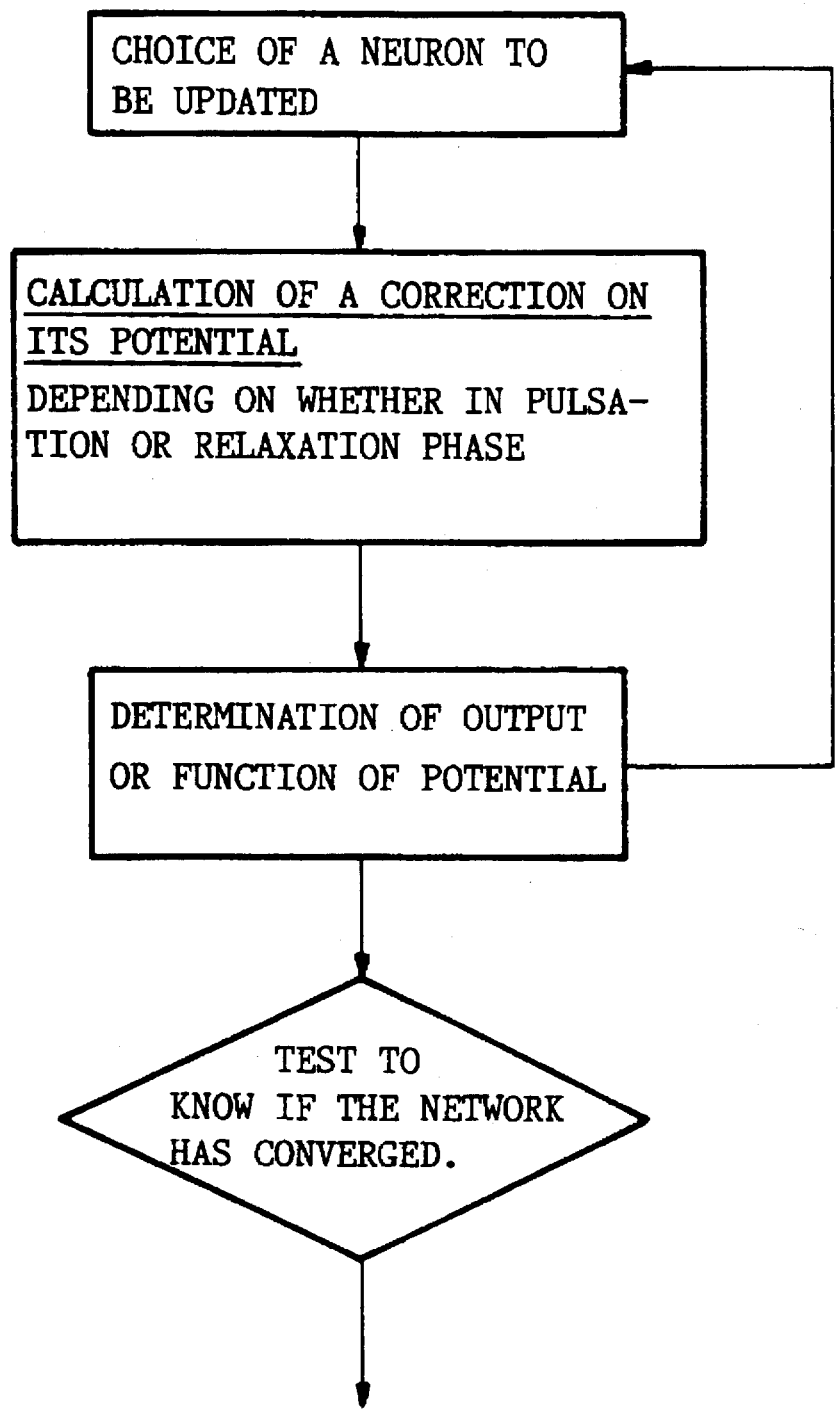
FIG. 2 illustrates the recursive dynamic operating stage.

This recursive dynamic operation is illustrated in FIG. 2.

Determination takes place of the correction to be applied to the potential $u_i$ of a neuron i at a date t and includes a linear combination of two terms:

one term serves to inhibit the neuron i if the neuron i is activated and the object associated with neuron i is related to at least one other object which is associated with a neuron that is also activated at the time t when the neuron i is updated. In other words, if the output $p_i$ of the neuron i at time t is 1, indicating that the neuron i is activated, then the term is given by:

$$p_i(t).T(\{p_j(t)\})$$

where T is a function of the outputs $p_j(t)$ of the neurons at the date t, which correspond to objects related to the object associated with the neuron i, e.g.:

$$T(\{p_j(t)\}) = -1 + h\left(\sum_{j=1}^{N} e_{ij} \cdot p_j(t)\right) \quad \text{with } N \text{ the object number}$$

$e_{ij}=1$ if the objects i and j are related
$e_{ij}=0$ if the objects i and j are not related
h: $\mathbb{R} \rightarrow \{0,1\}$ $\mathbb{R}$ being the set of real numbers
$x \rightarrow h(x)=1$ if $x=0$ $=0$ if $x \neq 0$
or, equivalently $$T(\{p_j(t)\}) = -\left[\sum_{j=1}^{N} e_{ij} \cdot p_j(t)\right] / deg(i) \text{ where } deg(i)$$

is the number of objects with which the object i is related;
one term serves to excite the neuron if the latter is deactivated and the associated object is not related to all the objects corresponding to the neurons activated at the date where it is considered, in other words if the output $p_i$ of the considered neuron i is 0 at the date $t(p_i(t)=0)$, then this correction is given by:

$$(1-p_i(t)).S(\{p_j(t)\})$$

where S is a function of the outputs $p_j(t)$ of the other neurons at the date t, which correspond to objects related to the object associated with the neuron i, e.g.

$$S(\{p_j(t)\}) = h\left(\sum_{j=1}^{N} e_{ij} \cdot p_j(t)\right)$$

h: $\mathbb{R} \rightarrow \{0,1\}$ $\mathbb{R}$ being the set of real numbers
$x \rightarrow h(x)=1$ if $x=0$ $=0$ if $x \neq 0$
then, if the network has been updated less than a certain number of times which has been previously fixed since the last convergence, then an excitation is applied in order to attempt to increase, at the following convergence, the size of the object subset determined during the last convergence of the network.

Otherwise an interruption process stops the taking into account of said excitation, which can be written in the form:

$$\delta(\Delta u_1, \ldots, \Delta u_N, t).R(\{p_j(t)\})$$

For example:

$$\delta(\Delta u_1, \ldots, \Delta u_N, t).(1-p_i(t)).1(N-deg(i), \{p_j(t)\})$$

where:
δ returns 1 if the neural network has been updated less than certain number of times fixed since the last convergence,
1 returns 1 if N−deg(i) exceeds the greatest size of the subsets of objects found up to the date t,
0 otherwise.

Thus, the network alternates pulsation phases (when said last excitation is taken into account) and relaxation phases (when the interruption process stops the taking into account of the excitation). The network converges during the relaxation phase.

Once the network has converged, an excitation is again applied (pulsation phase).

Thus, the pulsation and relaxation phases are alternated a certain number of times fixed by the user as a function of the time which he has for finding a solution and the quality of the solution sought. At the end of each relaxation phase (at convergence) the neurons whose output equals 1 encode a subset of objects pairwise which are not related.

In general terms, the potential variation equations can be written, for any i belonging to $\{1,N\}$:

$$\Delta u_i(t) = A.p_i(t).T(\{p_j(t)\}) + B.(1-p_i(t)).S(\{p_j(t)\}) + C.\delta(\Delta u_1, \ldots, \Delta u_N, t).R(\{p_j(t)\})$$

in which A,B and C are positive real numbers. Advantageously one takes A=B=C=1.

Advantageously the potential of each neuron is limited between two values fixed by the user in order to accelerate convergence, e.g.:
the potential is limited between the values of the order of magnitude of the corrections to be applied to the potential when the neuron is updated,
the values of the potentials are limited between $-10^{-\infty}$ and $10^{-\infty}$, so that any strictly negative correction to be applied to the potential of an activated neuron deactivates it and any strictly positive correction to be applied to the potential of a deactivated neuron activates it.

Figure 3:
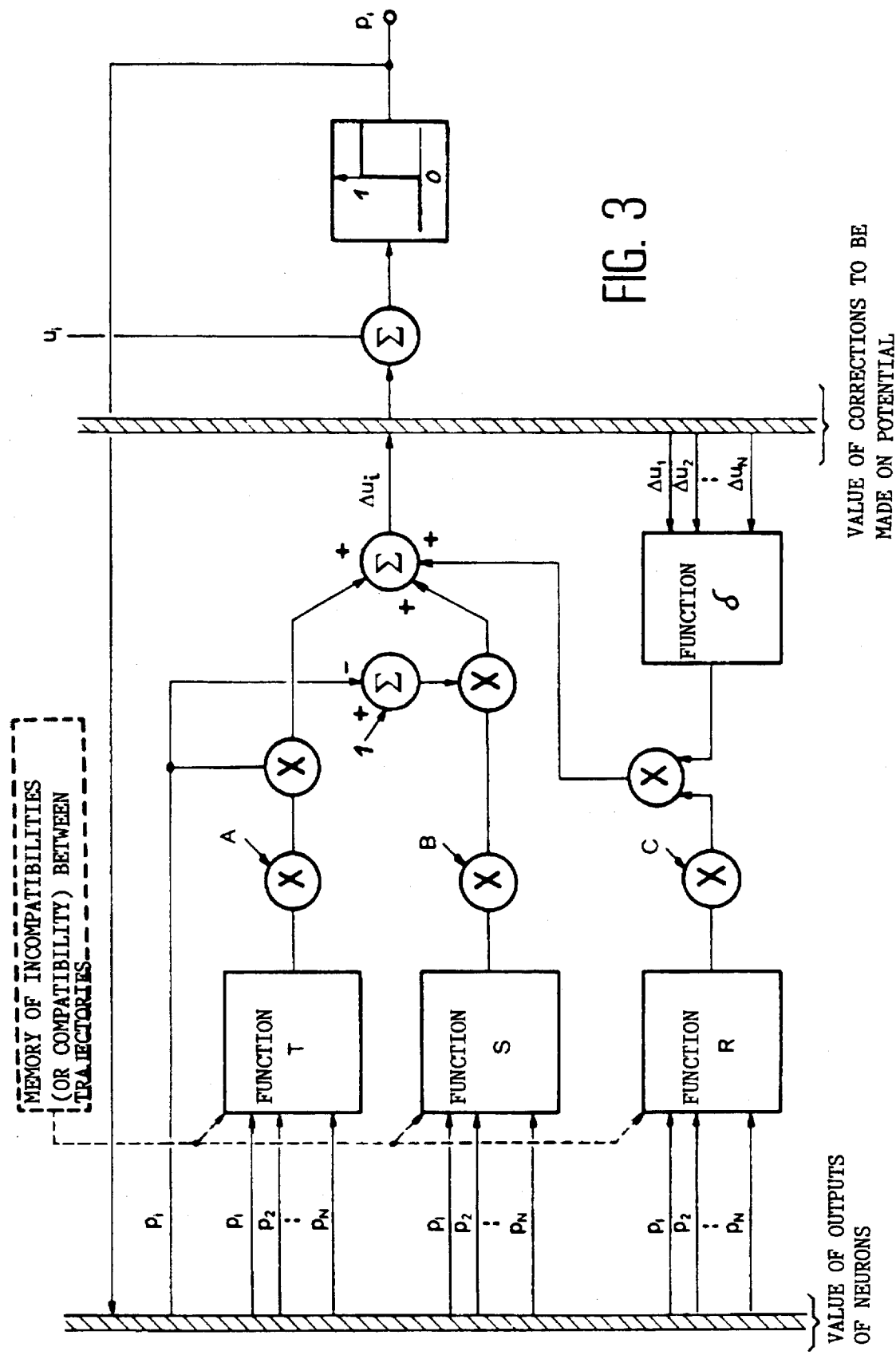
FIGS. 3 and 4 illustrate a neuron and a neural network associated with the device for performing the process of the invention.

FIG. 3 illustrates a neuron i. FIG. 4 gives the neural network associated with the device for performing the process of the invention.

This network comprises:
a first table memory 40 of the values of the outputs $p_i$ of the neurons receiving the output of a choice circuit 39 for an integer from 1 to N,
a second memory 41 of the relations between objects,
a third table memory 42 of the potentials of neurons,
a fourth table memory 51 of the final variations of the potentials of neurons,
a first computing circuit 43 making it possible to compute $A.p_i.T(\{p_j\})$,
a second computing circuit 44 making it possible to compute $B(1-p_i).S(\{p_j\})$;
a third computing circuit 45 making it possible to compute $C.R(\{p_j\})$,
these three computing circuits being connected to the outputs of the first two memories,
an interruption device 46 connected to the output of the third computing circuit and to the outputs of the fourth memory,
a first adder 47 receiving the outputs of the first two computing circuits and the interruption device,
a second adder 48 receiving the outputs of the third memory and the first adder,
a thresholding function circuit with a binary output 49 receiving the output of the second adder.

In the case of a digital device, said network also comprises a clock connected to all the elements (directly or indirectly) of the device.

The neural network evolves in the asynchronous mode, one neuron being updated at once.

It can be demonstrated that a thus defined neural network converges, i.e. there is a date t for which i, ∀i, ∀t'>t, $\Delta u_i(t')=0$) in the asynchronous mode following each relaxation phase and at convergence, the objects associated with the activated neurons are in pairs and not related.

LEXICON

Object

An object is a potential trajectory in a velocimetry application.

Neuron

A neuron i is defined by a potential $u_i$ and by a binary output $p_i$. When, during dynamic operation of the network, the neuron is considered at the date t, then:

a calculation takes place of a correction $\Delta u_i(t)$ to be applied to the potential $u_i(t+1)=u_i(t)+\Delta u_i(t)$, the output is updated:

if $u_i(t+1)>0$ then $p_i(t+1)=1$ if $u_i(t+1)<0$ then $p_i(t+1)=0$ activated neuron $p_i=1$
deactivated neuron $p_i=0$.

Relation

Expression of the incompatibility of two potential trajectories in a velocimetry application.

There is a set of objects from which it is wished to extract a subset proving a certain property based on relations between the objects. Considered in pairs, there is or is not a relation (resulting from an application) between the objects. If an object i is related to an object j, then $e_{ij}=1$, if not $e_{ij}=0$ ($e_{ij}$) is the matrix of relations between the objects.

Note: The process is the equivalent of seeking the largest subset of related objects. For this purpose it is sufficient to consider the related matrix ($1-e_{ij}$) and to use the process described in the present invention.

I claim:

1. A method for selecting an optimal number of trajectories in a velocimetry application, comprising the steps of:

receiving as input a class of potential trajectories and a matrix of pair-wise relations wherein each pair-wise relation indicates whether two potential trajectories in the received class are related to one another;

constructing a neural network including a plurality of neurons, wherein each neuron represents a potential trajectory in the received class, wherein a binary output of each neuron is based on an input potential of the neuron which is in turn based on outputs of neurons in the network, and wherein the output of each neuron indicates whether a represented potential trajectory is to be selected from the received class;

initializing the neural network with a valid initial solution, wherein the input potential and the output of each neuron in the network are stationary and the network is in an initially converged state;

exciting the network by applying correction factors to the input potentials of neurons in the network, wherein a correction factor applied to the input potential of a neuron includes a set-size maximizing term and is based in part on pair-wise relations associated with the neuron and on outputs of neurons in the network;

constraining the network by applying correction factors which do not include a set-size maximizing term to the input potentials of neurons in the network so that the network achieves a newly converged state, corresponding to an additional valid solution, wherein the input potential and the output of each neuron in the network are stationary;

decoding the outputs of the neurons in the network to establish a list of trajectories to be selected from the received class;

repeating said steps of exciting the network, constraining the network, and decoding the outputs of the network to establish a plurality of lists of trajectories to be selected from the received class; and selecting the trajectories identified in a longest list of trajectories to be selected from the received class.

2. The method of claim 1, wherein said steps of exciting the network and constraining the network are accomplished by asynchronously scanning the network and updating input potentials and corresponding outputs of neurons in the network.

3. The method of claim 2, wherein a transition from said step of exciting the network to said step of constraining the network is accomplished by modifying the use of correction factors in updating input potentials based on a number of times the network has been excited since a last convergence of the network.

4. The method of claim 1, wherein said steps of exciting the network and constraining the network are carried out in an attempt to obtain a list of trajectories which is longer than a previously longest list of trajectories.

5. The method of claim 4, wherein said repeating step is carried out a fixed number of times which is set by a user of the method based on a particular velocimetry application.

6. The method of claim 1, wherein each pair-wise relation is a binary number indicating whether two neurons are related to one another, and wherein said steps of exciting the network and constraining the network are carried out in an attempt to select a maximum number of trajectories which are not related.

7. The method of claim 6, wherein a correction factor includes an inhibiting term and an activating term, wherein the inhibiting term tends to inhibit a neuron when the neuron is activated and related to at least one other neuron which is activated, and wherein the activating term tends to activate a neuron when the neuron is inhibited and not related to other neurons which are activated.

8. The method of claim 1, wherein each pair-wise relation is a binary number indicating whether two neurons are related to one another, and wherein said steps of exciting the network and constraining the network are carried out in an attempt to select a maximum number of trajectories which are related.

9. The method of claim 8, wherein a correction factor includes an inhibiting term and an activating term, wherein the inhibiting term tends to inhibit a neuron when the neuron is activated and not related to other neurons which are activated, and wherein the activating term tends to activate a neuron when the neuron is inhibited and related to other neurons which are activated.

10. A device for selecting an optimal number of trajectories in a velocimetry application, comprising:

means for receiving as input a class of potential trajectories and a matrix of pair-wise relations wherein each pair-wise relation indicates whether two potential trajectories in the received class are related to one another;

a neural network including a plurality of neurons, wherein each neuron represents a potential trajectory in the received class, wherein a binary output of each neuron is based on an input potential of the neuron which is in turn based on outputs of neurons in the network, and wherein the output of each neuron indicates whether a represented object is to be selected from the received class;

means for initializing the neural network with a valid initial solution, wherein the input potential and the output of each neuron in the network are stationary and the network is in an initially converged state;

means for exciting the network by applying correction factors to the input potentials of neurons in the network, wherein a correction factor applied to the input potential of a neuron includes a set-size maximizing term and is based in part on pair-wise relations associated with the neuron and on outputs of neurons in the network;

means for constraining the network by applying correction factors which do not include a set-size maximizing term to the input potentials of neurons in the network so that the network achieves a newly converged state, corresponding to an additional valid solution, wherein the input potential and the output of each neuron in the network are stationary;

means for decoding the outputs of the neurons in the network to establish a list of trajectories to be selected from the received class;

means for storing the list of trajectories;

means for repeatedly exciting the network and constraining the network in order to decode, establish, and store a plurality of lists of trajectories to be selected from the received class; and means for comparing the plurality of lists to one another and for choosing a longest list of trajectories to be selected.

11. A device for selecting an optimal number of data objects from a class of available data objects, comprising:

a first memory storing input potentials corresponding to neurons in a neural network, wherein each neuron represents an object in the available class;

a second memory storing binary outputs corresponding to the neurons, wherein each output indicates whether a represented object is to be selected;

a third memory storing pair-wise relations, wherein each pair-wise relation indicates whether two neurons in the neural network, and therefore two objects in the available class, are related to one another;

a number generating circuit generating a number which corresponds to a neuron in the neural network;

an inhibiting circuit connected to said number generating circuit, said second memory, and said third memory computing, for a neuron specified by the number generating circuit, an inhibiting factor based on the outputs stored in said second memory and based on the pair-wise relations stored in the third memory;

an activating circuit connected to said number generating circuit, said second memory, and said third memory computing, for a neuron specified by the number generating circuit, an activating factor based on the outputs stored in said second memory and based on the pair-wise relations stored in the third memory;

an interruption device generating an interruption factor based on a number of times neurons in the neural network have been updated;

combining means connected to said inhibiting circuit, said activating circuit, and said interruption device for combining the inhibiting factor, the activating factor, and the interruption factor to create an input potential correction factor for a neuron specified by the number generating circuit;

updating means for applying the input potential correction factor to update a stored input potential of a neuron specified by the number generating circuit and for updating a stored output of the neuron specified by the number generating circuit based on the updated stored input potential;

controlling means for varying the number generated by the number generating circuit to update multiple neurons in the network and to maximize a number of stored outputs indicating that a represented object is to be selected.

12. A method for extracting a subset of trajectories from a class of potential trajectories in a velocimetry application using a neural network, comprising the steps of:

receiving as input the class of potential trajectories; constructing a recursive neural network from potential trajectories and relations between potential trajectories by associating with each trajectory i a binary output $p_i(t)$ of a formal neuron at a time t, wherein $p_i(t)=1$ indicates that a trajectory i belongs to a prevailing subset of trajectories at time t and $p_i(t)=0$ indicates that a trajectory i does not belong to a prevailing subset of trajectories at time t;

initializing the output $p_i(t)$ and a potential $u_i(t)$ of each neuron i such that, for each neuron i, $p_i(t=0)=1$ when $u_i(t=0) \geq 0$ and $p_i(t=0)=0$ when $u_i(t=0) \leq 0$;

using a recursive dynamic operation of the neural network to update outputs of neurons in the network;

using an interruption process to control the recursive dynamic operation of the neural network in order to obtain maximized subsets of trajectories in pairs, wherein trajectories in a pair are one of a) related to one another and b) not related to one another, wherein an obtained maximized subset cannot be included in an obtainable subset having a size which is larger than the obtained maximized subset, and wherein maximized subsets are obtained by repeatedly attempting to increase a size of a prevailing subset; and choosing a largest maximized subset from a list of maximized subsets obtained as a result of said steps of using a recursive dynamic operation of the neural network and using an interruption process.

13. A method according to claim 12, wherein said steps of using a recursive dynamic operation of the neural network and using an interruption process comprise the additional steps of:

asynchronously updating, in one of i) a random fashion and ii) a sequential fashion, the neurons of the network by scanning the neurons in succession and applying to the potential of each scanned neuron a previously calculated correction factor which is dependent on the values of the outputs of other neurons in the network and on relations between potential trajectories; and decoding the outputs of the neurons in the network to obtain a list of subsets of trajectories in pairs, wherein trajectories in a pair are one of 1) related to one another and 2) not related to one another, and wherein each subset of trajectories in the list is maximized so that it cannot be included in an obtainable subset of trajectories having a size larger than the subset in the list.

14. A device for extracting a subset of trajectories from a class of potential trajectories in a velocimetry application using a neural network, wherein said neural network comprises:

a selection circuit for selecting and providing an output corresponding to an integer in a range 1 to N;

a first table memory of outputs $p_i$ of neurons in the neural network, wherein said first table memory receives the output of said selection circuit;

a second memory of relations between trajectories;

a third table memory of potentials of neurons, wherein said third table memory receives the output of said selection circuit;

a fourth table memory, coupled to the output of said selection circuit, of last variations of potentials of neurons;

a first computing circuit, coupled to outputs of said first and second memories and receiving the output of said selection circuit, computing a value $A \cdot p_i \cdot T(\{p_j\})$, wherein A is a positive real number and wherein T is a function of outputs $p_j(t)$ of network neurons at a time t which correspond to trajectories which are one of a) related to a neuron i and b) not related to a neuron i;

a second computing circuit, coupled to outputs of said first and second memories and receiving the output of said selection circuit, computing a value $B \cdot (1-p_i) \cdot S(\{p_j\})$, wherein B is a positive real number and wherein S is a function of outputs $p_j(t)$ of network neurons at a time t which correspond to objects which are one of 1) related to a neuron i and 2) not related to a neuron i;

a third computing circuit, coupled to outputs of said first and second memories and receiving the output of said selection circuit, computing a value $C \cdot R(\{p_j\})$, wherein C is a positive real number and wherein R is a function indicating a size of a subset of potential trajectories at a last convergence of the neural network;

an interruption device connected to an output of said third computing circuit and to outputs of said fourth memory;

a first adder receiving outputs of said first and second computing circuits and said interruption device and having an output connected to an input of said fourth memory;

a second adder receiving outputs of said third memory and said first adder and having an output connected to an input of said third memory; and a thresholding function circuit receiving an output of said second adder and having a binary output connected to an input of said first memory.

* * * * *